May 3, 1932. B. F. P. POORE 1,857,003
APPARATUS FOR MOLDING HOLLOW CONCRETE BLOCKS
Filed Aug. 10, 1928 6 Sheets-Sheet 1
Fig. 1.
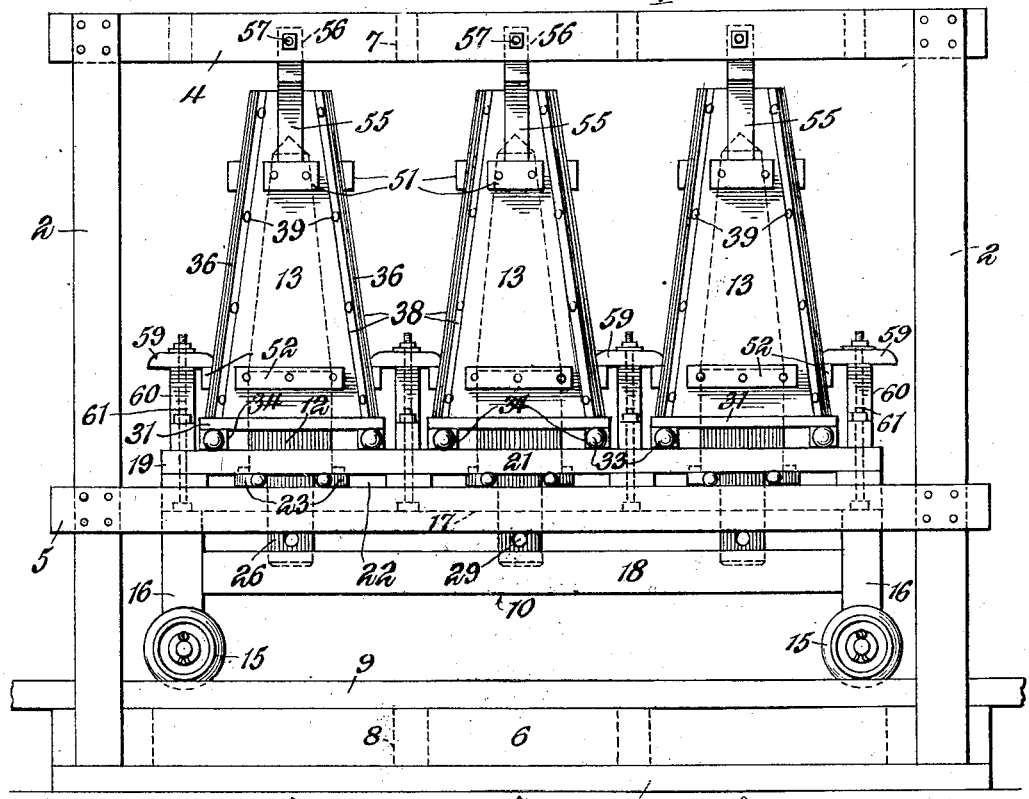
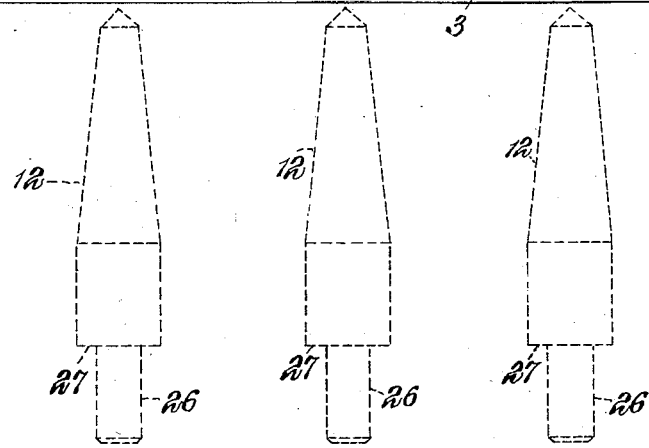
Inventor
Attorney May 3, 1932. B. F. P. POORE 1,857,003
APPARATUS FOR MOLDING HOLLOW CONCRETE BLOCKS
Filed Aug. 10, 1928  6 Sheets-Sheet 2
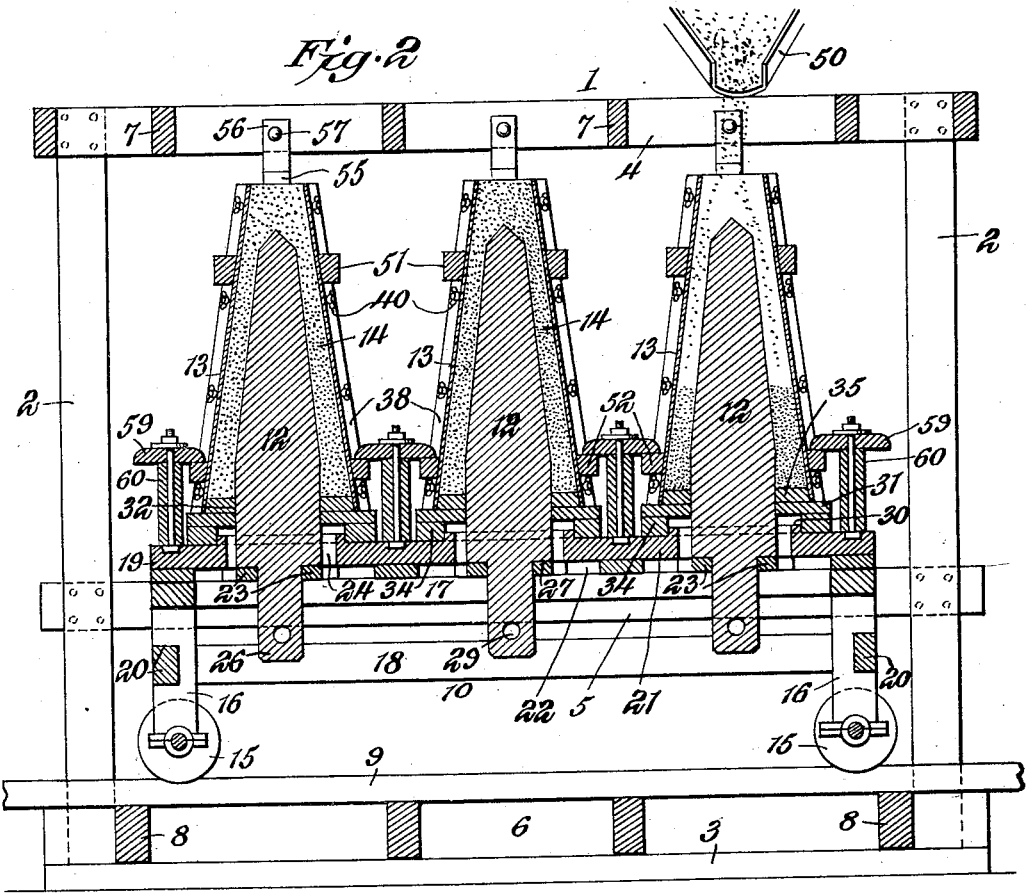
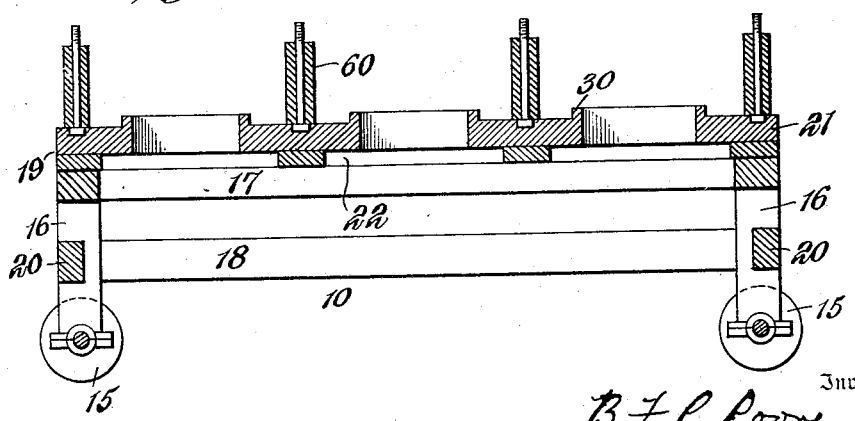
Inventor
B. F. P. Poore
By
Attorney May 3, 1932. B. F. P. POORE 1,857,003
APPARATUS FOR MOLDING HOLLOW CONCRETE BLOCKS
Filed Aug. 10, 1928  6 Sheets-Sheet 3

Inventor
B. F. P. Poore
By
Attorney

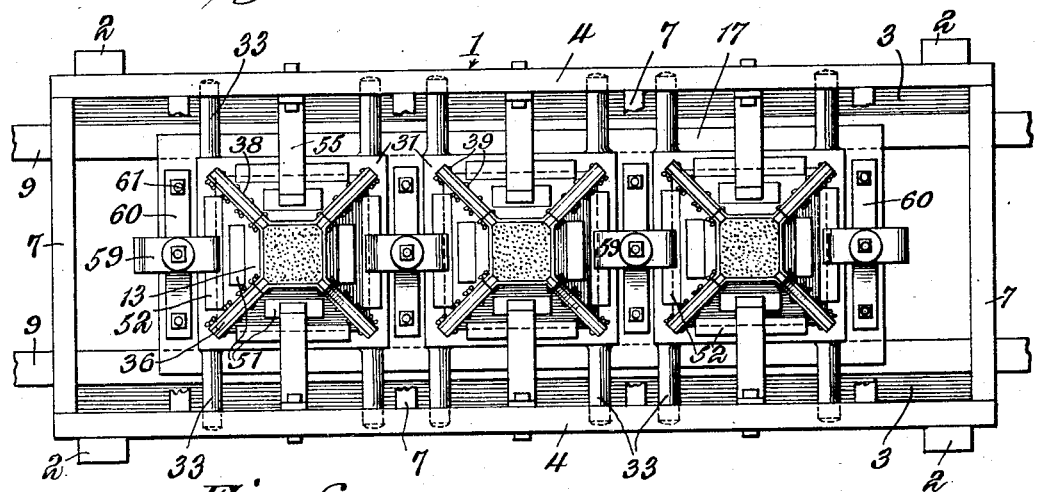

May 3, 1932.   B. F. P. POORE   1,857,003
APPARATUS FOR MOLDING HOLLOW CONCRETE BLOCKS
Filed Aug. 10, 1928   6 Sheets-Sheet 5
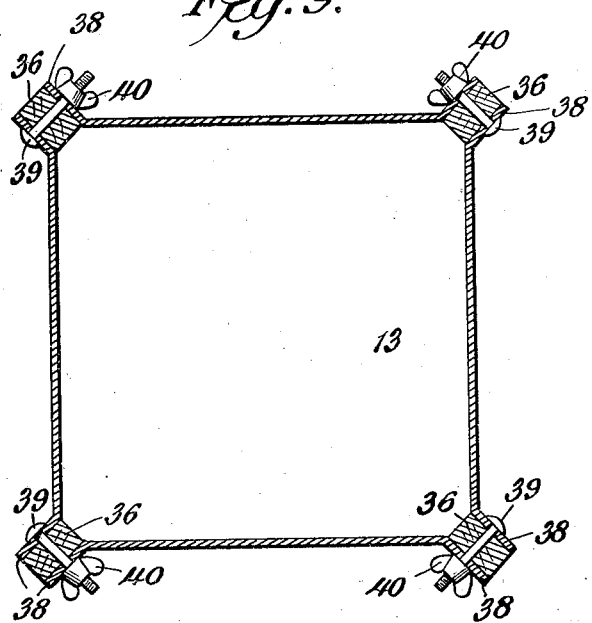
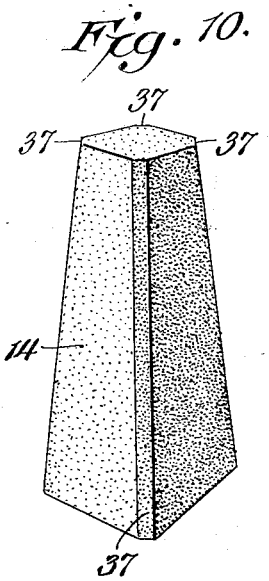
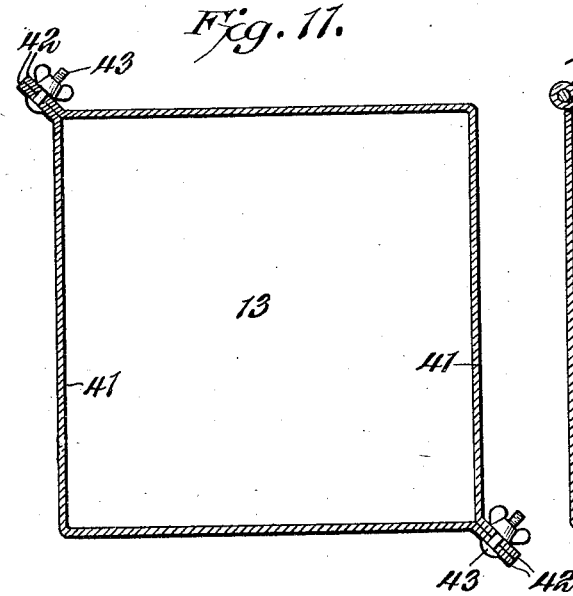
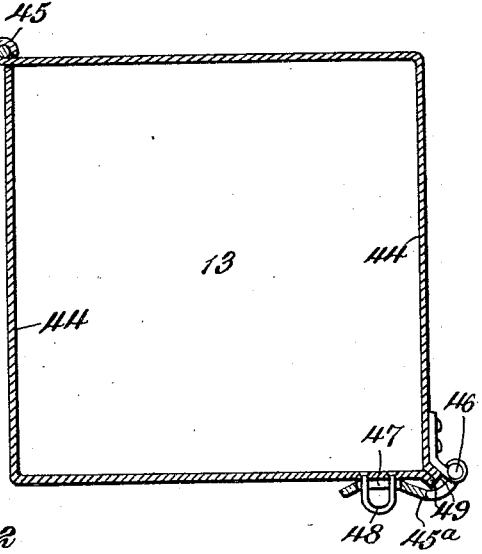

May 3, 1932. B. F. P. POORE 1,857,003
APPARATUS FOR MOLDING HOLLOW CONCRETE BLOCKS
Filed Aug. 10, 1928 6 Sheets-Sheet 6

B. F. P. Poore Inventor

By ____ Attorney

Patented May 3, 1932

1,857,003

UNITED STATES PATENT OFFICE

BENJAMIN F. P. POORE, OF GREENVILLE, MISSISSIPPI

APPARATUS FOR MOLDING HOLLOW CONCRETE BLOCKS

Application filed August 10, 1928. Serial No. 298,842.

The invention relates to an apparatus for molding hollow concrete blocks.

The object of the present invention is to provide a simple, practical, and comparatively inexpensive apparatus designed primarily for molding hollow tapered concrete blocks adapted for supporting frame and other structures and designed to take the place of solid concrete blocks ordinarily employed for supporting buildings and other structures.

A further object of the invention is to provide a molding apparatus of this character adapted to mold hollow concrete blocks less than the cost of constructing solid concrete blocks, and to enable tapered hollow concrete blocks to be readily molded and the cores to be readily withdrawn and removed from the molds and the concrete blocks conveniently handled after the material has set and hardened.

Another object of the invention is to provide simple and efficient means for holding the tapering molds down upon the pallets to prevent such molds from being lifted by the plastic concrete when the same is poured into the molds.

It is also an object of the invention to equip the mold with filling collars or sleeves adapted to enable a plurality of different sizes to be molded without changing the size of the molds or the cores.

While the molding apparatus is designed primarily for molding hollow concrete blocks, yet it is also an object of the application to enable solid tapering concrete blocks to be molded more rapidly and cheaply than heretofore.

With these and other objects in view, the invention consists in the construction and novel combination and arrangement of parts hereinafter described, illustrated in the accompanying drawings, and set forth in the claims hereto appended, it being understood that minor changes in the form, size, and minor details of construction, within the scope of the claims, may be resorted to without departing from the spirit of the invention or sacrificing any of the advantages thereof.

In the drawings:

Figure 1 is a side elevation of a molding apparatus constructed in accordance with this application, the cores being shown lowered in dotted lines.

Fig. 2 is a longitudinal sectional view of the molding apparatus.

Fig. 5 is a plan view of the molding apparatus.

Fig. 6 is a horizontal sectional view of the molding apparatus, the pallets being shown in plan view.

Fig. 7 is a plan view of a portion of the carriage.

Fig. 8 is a longitudinal sectional view of the carriage.

Fig. 9 is a horizontal sectional view of the mold.

Fig. 10 is a perspective view of one of the concrete blocks having beveled corner edges.

Fig. 11 is a horizontal sectional view of another form of mold having two separable sections.

Fig. 12 is a horizontal sectional view of another form of mold composed of two hinged sections.

Fig. 17 is a plan view of one of the pallets.

Figure 3:
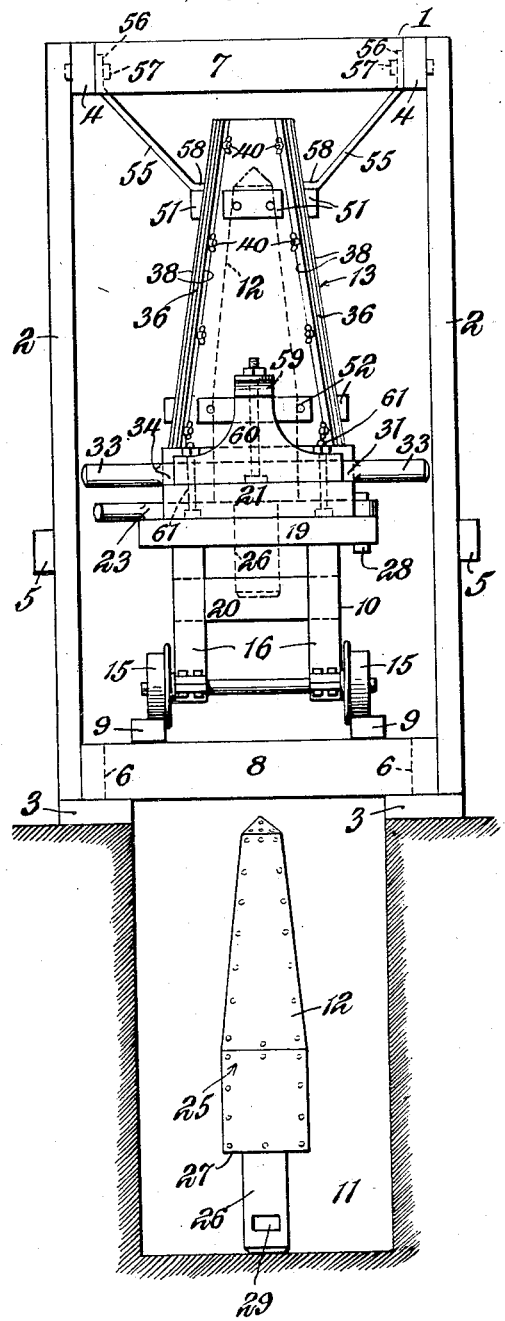
Fig. 3 is an end elevation of the molding apparatus, the walls of the pit being in section and the core being shown lowered in full lines and in elevated operative position in dotted lines.
Figure 4:
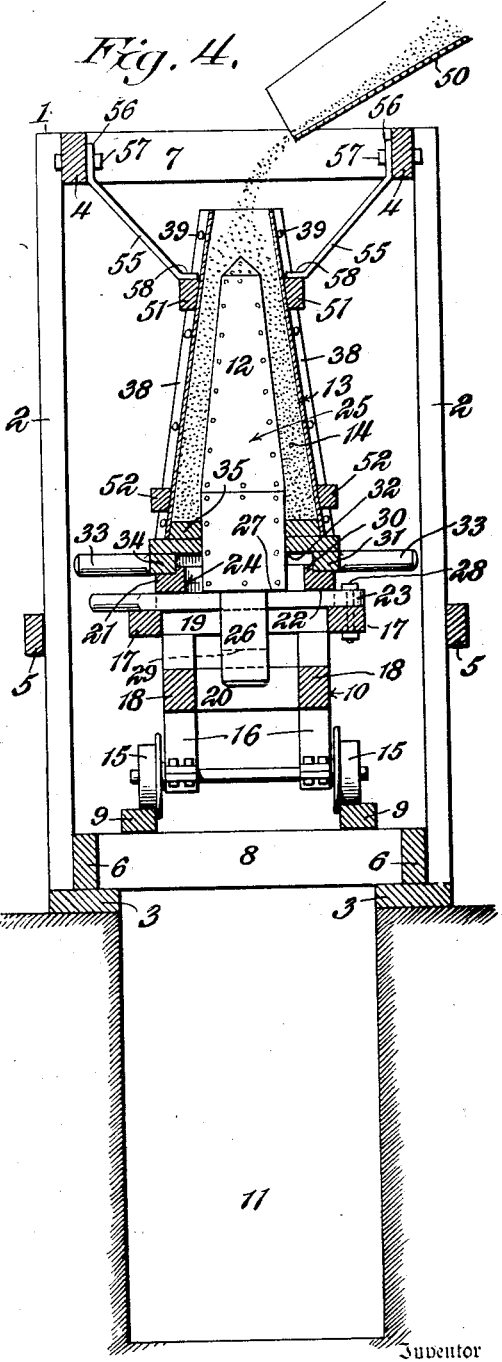
Fig. 4 is a transverse sectional view of the molding apparatus.

In the accompanying drawings, in which is illustrated the preferred embodiment of the invention, the molding apparatus comprises in its construction a main frame 1 designed to be constructed of wood or any other suitable material and composed of spaced sides and connecting transverse frame members. The sides of the frame are formed by uprights 2 preferably arranged upon sills 3, but any other suitable form of base may, of course, be employed. The uprights are connected by top, intermediate, and bottom longitudinal bars 4, 5 and 6. The sides of the frame are connected by top and bottom transverse bars 7 and 8, and the latter support rails 9 which form a track for a carriage 10. The main frame may, of course, be of any other desired construction and may be of any suitable dimensions and may be of a length to accommodate any desired number of molds. In the accompanying drawings, the carriage 10 is shown supporting three molds, but the number may be varied, as will be readily understood. The main frame is designed to be located over a pit 11 which is designed to permit cores 12 to be lowered from the dotted line position illustrated in Fig. 3 of the drawings to the full line position in the said figure, for removing the core from the mold 13. This is preferable when a main frame such as is illustrated in the accompanying drawings is employed, and there is not sufficient head room to permit the mold 13 to be lifted off the molded concrete block 14, but a main frame may be employed of a character which will permit the mold 13 to be removed from a molded concrete block and the cores may then be left in position until the concrete blocks have set and hardened sufficiently to enable them to be removed from the cores.

The carriage is preferably mounted upon wheels 15 which are flanged as shown to run on the rails 9, but any other form of carriage may be employed, and the said carriage 10 is provided with a suitable frame having corner standards 16 and upper and lower longitudinal connecting bars 17 and 18 and upper and lower transverse connecting bars 19 and 20. The upper transverse connecting bars 19 are arranged upon the upper faces of the upper longitudinal bars 17 to space a pallet supporting frame 21 from the frame of the carriage to provide a plurality of spaces 22 beneath the pallet supporting frame and core rest levers 23.

Figure 13:
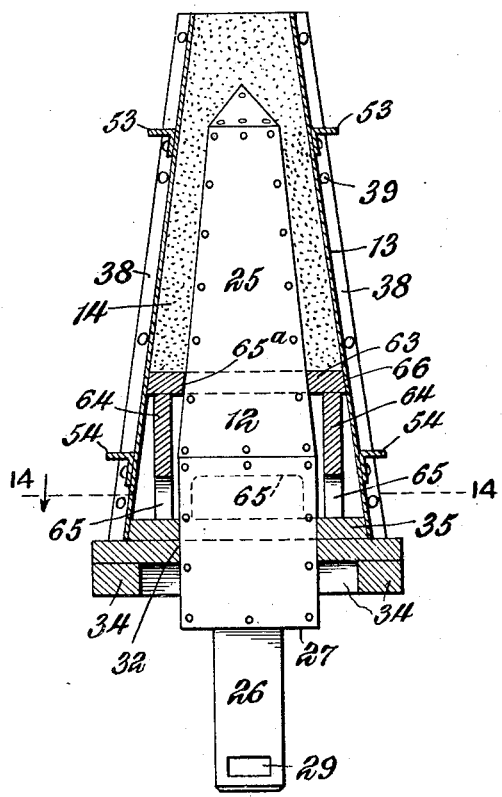
Fig. 13 is a vertical sectional view through one of the molds and illustrating the arrangement of the filling collar or sleeve for reducing the effective size of the mold.

The pallet supporting frame, which may be of any preferred construction, is composed of suitable longitudinal bars and connecting members, and it is provided at intervals with rectangular core receiving openings 24 through which the cores 12 project and which will permit the cores to be raised to operative position and to be lowered into the bed to remove them from the molds 13 when desired. The cores 12, which may be constructed of any suitable material, in practice will be preferably of wood and covered with a suitable sheathing 25 of sheet metal, as illustrated in detail in Figs. 13 and 14 of the drawings. The cores are provided with a tapered upper portion which is preferably arranged in parallelism with the sides of the mold 13, which is correspondingly tapered, and the lower portion of the body of the core is rectangular in cross section and extends through the opening 24. The core is provided at the lower end with a shank 26 which is of a less diameter than the body portion of the core to form a horizontal shoulder 27 to rest upon the core rest levers 23.

The core rest levers are arranged in pairs and extend across the carriage and are pivoted at one end at 28 to the carriage, and they are provided at their other ends with suitable grips or handles to enable them to be readily opened and closed to arrange them beneath the shoulders 27 of the cores and to spread them to permit the cores to be lowered. The shanks 26 of the cores may be provided with suitable openings 29 for the reception of fastening devices for rigidly connecting or securing the cores to the carriage, and any suitable means may, of course, be provided for positively holding the core rest levers in their closed position. In practice, the weight of the cores resting upon the core rest levers will be ample to retain the levers in their closed position.

The pallet supporting frame may be provided at the openings 24 with marginal flanges 30 for centering pallets 31 on the frame 21. The pallets 31, which are provided with rectangular core receiving openings 32, are preferably rectangular in form, as clearly illustrated in Fig. 17 of the drawings, and they may be provided with handles or grips 33 for enabling the pallets to be removed, and the handles or grips 33 will facilitate the removal of the molded concrete blocks when removable pallets are employed. Instead of providing removable pallets, however, the handles or grips 33 may be omitted and the pallets may be secured to the frame 21 by any suitable means. The pallets 31 may be constructed of any suitable material, and they are provided preferably at their lower faces with reinforcing and supporting cleats 34 which rest upon the pallet supporting frame and which fit around the marginal flanges 30 of the pallet supporting frame.

The openings 32 of the pallets 31 fit the lower rectangular portion of the cores, which are maintained in an upright position during the molding operation, as clearly illustrated in Fig. 2 of the drawings.

The mold 13, which is open at the top, is arranged upon the pallets 31, which is provided at its upper face with cleats 35 surrounding the opening 32 and beveled at their outer side edges 33 to fit the taper of the sides of the mold 13. The mold 13 is composed of four similar upwardly tapered sides and inclined corner bars 36, which form bevels 37 at the corners of the tapered concrete block 14. The sheet metal sides or sections of the mold 13 are provided at the side edges with outwardly extending flanges 38, and the corner strips or bars 36 are secured between the flanges 38 by bolts 39 which will permit the sides or sections of the mold to be separated, and the said bolts 39 are provided with wing nuts 40 for facilitating such operation. Instead of constructing the pyramidal molds or forms in four separate sections, they may be constructed of two separable sections 41 provided at opposite corners of the mold or form with outwardly extending abutting flanges 42 which are detachably secured together by bolts 43. Each section 41 constitutes two sides of the form or mold, which is adapted to produce a concrete block with sharp edges or corners. Also, instead of providing two separable sections 41, the mold or form may, as illustrated in Fig. 12 of the drawings, be provided with two sections 44 hinged together at 45 at one corner of the mold and detachably secured together at the diagonally opposite corners of the mold by any suitable fastening means.

In Fig. 12 of the drawings, the fastening means consists of a hasp 45ª hinged at one end at 46 to one of the separable sections 44 of the mold and provided at the other end with a slot 47 to receive a staple 48 fixed to one of the sections 44 and adapted to receive a pin or any other suitable means for retaining the hasp in its locked position. Any other suitable means may, of course, be employed for detachably securing the abutting edges 49 of the sections 44 together, and the said edges 49 are bent at an angle to form narrow flanges, as clearly shown in Fig. 12. The separable sections enable the forms or molds to be opened and closed to loosen them from the molded concrete blocks and to arrange them for molding the same. Various other constructions of tapering pyramidal molds may, of course, be employed, and the mold or form may be either lifted off the molded concrete block, or sections thereof separated to permit removal of the mold or form. Also, the removal of the forms may be effected while the carriage is within the main frame, or if desired, a carriage having a plurality of molded concrete blocks may be run from the frame to any other suitable point for handling and manipulating the molded blocks and the molding apparatus. In arranging the apparatus for use, the pallets are placed in position on the pallet supporting frames of the carriage and the cores are set upon the core rest levers. The forms are then placed in position, but the operation may be varied by placing the forms in position and then raising the cores into position and setting them upon the core rest levers, and in practice any suitable means may be provided for handling the cores for raising and lowering the same. Unless the cores are of an excessive weight the molded concrete will retain them in position until they are positively pulled from the molded blocks.

Figure 14:
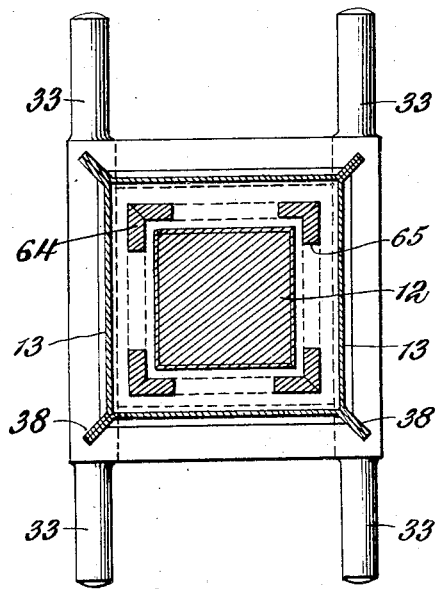
Fig. 14 is a horizontal sectional view on the line 14—14 of Fig. 13.

The concrete is poured into the molds from a suitable spout 50 which may be movable to transfer it from one mold to another, or the molds may be successively brought beneath the spout by movement of the carriage. When the concrete is poured into the upwardly tapering mold or form, the tendency of the material is to lift the form from the pallet, and in order to prevent the form or mold from being lifted from the pallet by the action of the concrete or other plastic material, the molding apparatus is equipped with upper and lower holding devices which securely clamp the molds in position and prevent them from being lifted by the molded material. The molds are provided at their upper and lower portions with horizontal shoulders or ridges formed by horizontally disposed bars 51 and 52 which may be either solid bars or pieces, as illustrated in Figs. 1 to 4, inclusive, or angle bars, 53 and 54, as shown in Fig. 14. The upper holding devices, which are located at opposite sides of the main frame, consist of inclined locking bars 55 having their upper ends 56 bent at an angle and arranged vertically against the inner faces of the top longitudinal bars of the main frame and pivoted to the same by horizontal bolts 57 or other suitable pivots. The lower ends 58 of the upper locking bars 55 are bent at an angle and are arranged horizontally to engage the upper horizontal bars 51 of the molds. The pivoted locking bars 55 are adapted to swing on the bolts 57 to engage them with and disengage them from the upper seats or ridges formed by the bars 51. The locking bars 55 are arranged diametrically opposite each other and firmly hold and brace the upper portion of the mold.

Various other forms of holding devices may be employed for engaging the upper portion of the mold for holding the same rigidly in proper position with relation to the core and the pallet.

Various forms of lower holding devices may, of course, be employed, and in the accompanying drawings the lower holding devices are in the form of pivoted buttons 59 which engage the seats or shoulders formed by the lower bars 52 of the molds. The upper locking bars engage the mold at opposite sides thereof and the pivoted buttons engage the mold at the alternate sides of the form and are mounted on transverse supporting bars 60 and are secured to the same by vertical bolts 61 which pass through central openings in the pivoted buttons. The pivoted bolts 61 permit the buttons to be turned into and out of engagement with the lower bars 52 of the molds and they are adapted to be located between the molds and are capable of engaging the adjacent lower bars 52 of two molds, as clearly illustrated in Figs. 2 and 5 of the drawings. The pivoted buttons are adapted to be readily turned to engage them with the lower bars 52 of the molds and to disengage them from the bars for releasing the molds. Any other suitable locking means may, of course, be substituted for the pivoted buttons for securing the lower portions of the molds firmly in position to prevent the concrete or other material from lifting the molds from the pallets. Also, pivoted locking devices may be employed at the lower portions of the forms or molds at opposite sides of the same, if desired. This will enable the lower portion of the molds to be locked down at all four sides of the same.

After the blocks are molded and the plastic material has been allowed to set for a certain time, the molds or forms are removed and the blocks are smoothed with a trowel and are allowed to remain on the pallets until the material has completely set. The core bars may be removed from the blocks, or, when the blocks are small or light, they may be lifted off the cores.

Figure 15:
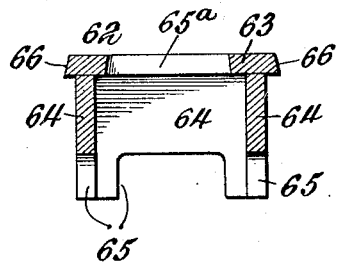
Fig. 15 is a detail sectional view of the filling collar.
Figure 16:
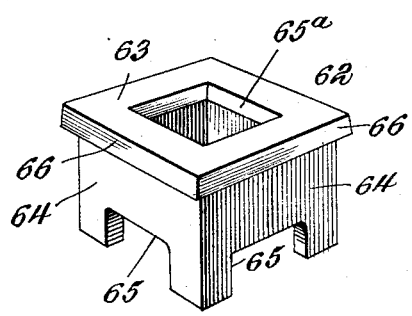
Fig. 16 is a detail perspective view of the filling collar.

In practice, the forms or molds and the cores will be constructed for molding the maximum size of concrete block design, and when it is desired to mold smaller concrete blocks, a filler collar or sleeve 62 will be employed. In practice, the molding apparatus will be equipped with a set of filler collars or sleeves of different sizes for varying the effective molding space within the forms. The filler collar, which may be constructed of wood or any other suitable material, consists of a horizontal top 63 and supporting members 64, which forms the sides of the filler collar and which are preferably secured together at their side edges. The top 63 is arranged upon the upper edges of the supporting members 64, which are preferably cut away at the bottom at 65, as shown. The horizontal top 63 is provided with a central opening 65$^a$ which fits the tapered portion of the core, and it has beveled marginal edges 66 which fit the inner end faces of the tapering form or mold. The edges of the top at the opening 65$^a$ are inclined or beveled and extend downwardly or outwardly, as clearly illustrated in Figs. 13 and 15 of the drawings. The supporting members 64 of the filler collars rest upon the pallet and support the top 63 in proper position within the mold.

The filler collar will constitute the bottom of the mold and by varying the size of the top 63 and the support 64, concrete blocks of any size within the capacity of the mold may be molded, as will be readily understood. The filler collars will not interfere with the removal of the cores when the latter are lowered from their operative position, and they may be placed over the cores when the latter are set prior to assembling the mold or form and placing the same in position. The molding apparatus will enable the tapered concrete blocks to be rapidly and cheaply molded and easily and quickly handled, and will materially reduce the cost of manufacturing blocks for supporting various building structures. The apparatus is also adapted for molding solid tapered blocks, and this may be effected by omitting the cores and the openings in the pallets and providing a solid pallet. This will enable solid tapered concrete blocks to be manufactured at a reduced cost.

What is claimed is:

1. A molding apparatus of the class described, including a fixed main frame, a movable carriage, a pallet mounted on the movable carriage, an upwardly tapered form removably arranged upon the pallet, and upper and lower holding devices mounted respectively on the main frame and on the carriage and engaging the form at the upper and lower portions thereof for securing the form on the pallet to prevent the form from being lifted by concrete or other plastic material when the same is poured into the form.

2. A molding apparatus of the class described, including a fixed main frame, a movable carriage, a pallet carried by the carriage, an upwardly tapered form arranged upon the pallet and provided with upper and lower seats, upper pivoted locking bars mounted on the fixed main frame and detachably engaging the upper seats of the form at opposite sides of the same, and lower pivoted locking members mounted on the carriage and engaging the lower seats of the form at alternate sides thereof.

3. A molding apparatus of the class described, including a fixed main frame, a movable carriage, a pallet mounted on the carriage, a form arranged on the pallet and provided with upper and lower seats, locking bars pivoted to the main frame and engaging the upper seats of the form at opposite sides thereof, and pivoted locking members mounted on the carriage and engaging the lower seats of the form at the alternate sides of the said form.

4. A molding apparatus of the class described, including a fixed main frame provided with a track, a movable carriage arranged on the track, a pallet mounted on the carriage, an upwardly tapered form arranged on the pallet, upper inclined locking bars pivoted to the frame at opposite sides thereof and detachably engaging the upper portion of the form, and horizontally movable lower locking members pivotally mounted on the carriage and engaging the lower portion of the form at the alternate sides thereof.

5. A molding apparatus of the class described, including a fixed main frame, a movable carriage, a pallet mounted on the movable carriage, a form arranged upon the pallet and provided with upper and lower seats, upper locking bars mounted on the main frame and detachably engaging the upper seats of the form, and lower locking members mounted on the carriage and engaging the lower seats of the form.

In testimony whereof I have hereunto set my hand this 23d day of July, 1928.

BENJAMIN F. P. POORE.